Dec. 23, 1958 W. TANNENBAUM ET AL 2,865,631

MEANS FOR AND METHOD OF DRIVING TAPE

Filed Sept. 3, 1957 3 Sheets-Sheet 1

WESLEY TANNENBAUM
JOSEPH F. CLEARY
ELLIS HUDES
A. LEONARD GOLDSTEIN

*INVENTORS*

BY Alden D. Redfield
Warren Kunz
ATTORNEYS

MEANS FOR AND METHOD OF DRIVING TAPE

Filed Sept. 3, 1957 3 Sheets-Sheet 2

WESLEY TANNENBAUM
JOSEPH F. CLEARY
ELLIS HUDES
A. LEONARD GOLDSTEIN
INVENTORS

BY Alden D. Redfield
Warren Kunz
ATTORNEYS

MEANS FOR AND METHOD OF DRIVING TAPE

Filed Sept. 3, 1957 3 Sheets-Sheet 3

WESLEY TANNENBAUM
JOSEPH F. CLEARY
ELLIS HUDES
A. LEONARD GOLDSTEIN
*INVENTORS*

BY Alden D. Redfield
Warren Kunz
ATTORNEYS

United States Patent Office 2,865,631

Patented Dec. 23, 1958

2,865,631

MEANS FOR AND METHOD OF DRIVING TAPE

Wesley Tannenbaum, Bedford, Joseph F. Cleary, Norwood, Ellis Hudes, Framingham, and Alfred Leonard Goldstein, Bedford, Mass., assignors to Avco Manufacturing Corporation, Cincinnati, Ohio, a corporation of Delaware Application September 3, 1957, Serial No. 681,839

12 Claims. (Cl. 271—2.3)

The present invention relates to a means for and method of driving a piece of flexible tape and more particularly concerns equipment for rapidly accelerating tape to high operating speeds and rapidly decelerating it as required in intermittently operated systems.

The invention is well suited for use in recorder-reproducer communication systems and represents an improvement upon the invention disclosed in application Serial No. 651,080, entitled "Magnetic Drive and Brake for Magnetic Tape," filed in the United States Patent Office on April 5, 1957, by William P. Goldberg et al. It should be understood, however, that the present invention is not restricted in its application to use with magnetic tape but may be used with any flexible tape to which motion must be suddenly imparted, or which must be suddenly stopped. For simplicity, however, the invention will first be described with reference to magnetic tape recorder-reproducer apparatus.

The invention lends itself particularly well to use in high speed communication systems requiring intermittent transmission of recorded information during relatively short and spaced time intervals. For such use the mechanism for driving the tape must be able to accelerate it to full operating speed in an extremely short time period and must also be able to bring the tape to rest almost instantaneously. The value of such a drive will be appreciated when it is understood that it is desirable to transmit information at a fixed operating speed and that information on the tape which passes the recorder head at speeds other than the fixed speed may be distorted or completely lost.

Briefly, the present invention comprises a capstan which rotates at constant speed. Over the capstan is trained a piece of tape, which may be magnetic recorder tape that can be magnetically drawn into driven engagement with the periphery of the capstan when a coil, located within the capstan, is electrically energized. The specific improvement of this invention concerns the provision of metallic strips about the periphery of the capstan adjacent the exposed surface of the tape. When the capstan is energized, these strips are drawn into engagement with the tape, pressing it against the capstan. Although without the strips the magnetic capstan is suitable for driving the tape, with the strips a marked improvement in speed and certainty of operation is assured. Further, the strips make it possible to use the capstan for driving tape which is non-magnetic.

In view of the foregoing it will be understood that a broad object of the present invention is the provision of an improved means for and method of imparting motion to a piece of material.

It is a further object of the invention to provide an improved means for and method of quickly accelerating and decelerating a flexible tape.

More specifically, the invention comprises the provision of means which can be drawn into engagement against a flexible tape for pressing it into driven engagement with a moving member.

It is also an object of the invention to provide magnetic means which may be acted upon by a magnetic field to increase the acceleration of a tape by pressing it against a moving member and which will quickly release the tape from driven engagement with the member when the field is removed.

A particular advantage of the invention is that it is simple in construction, economical to produce and reliable in operation.

The novel features that are characteristic of the invention are set forth in the appended claims; the invention itself, however, both as to its organization and method of operation, together with additional objects and advantages thereof, will best be understood from the following description of a specific embodiment of the invention when read in conjunction with the accompanying drawings, in which:

Figure 5:
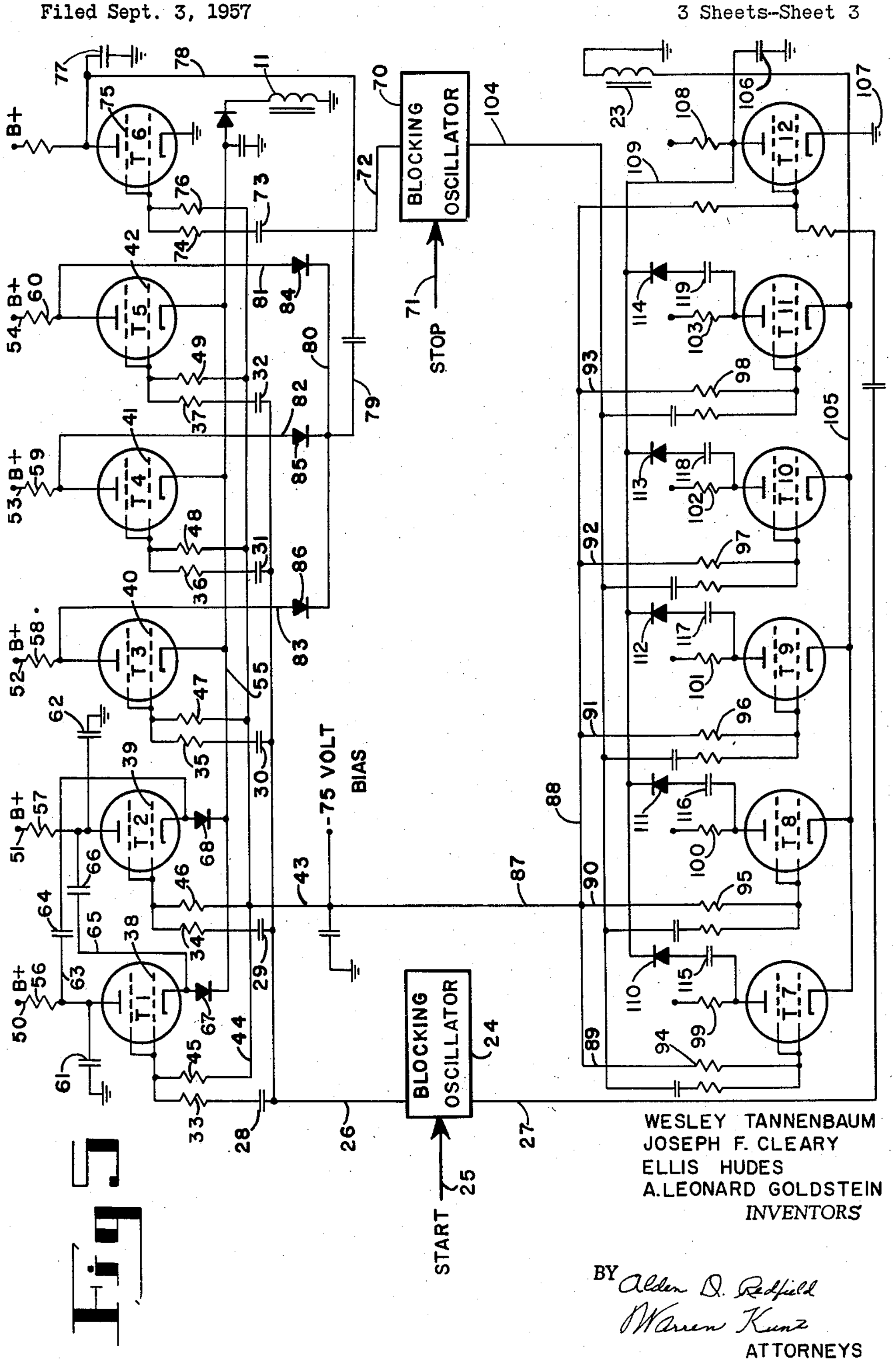

Figures *4a* and *4b* show top and side views of a clamping strip which cooperates with the capstan; and Figure 5 is a diagram of a circuit for energizing and de-energizing both the magnetic capstan for driving the tape and a magnetic brake for arresting its motion.

Figure 1:
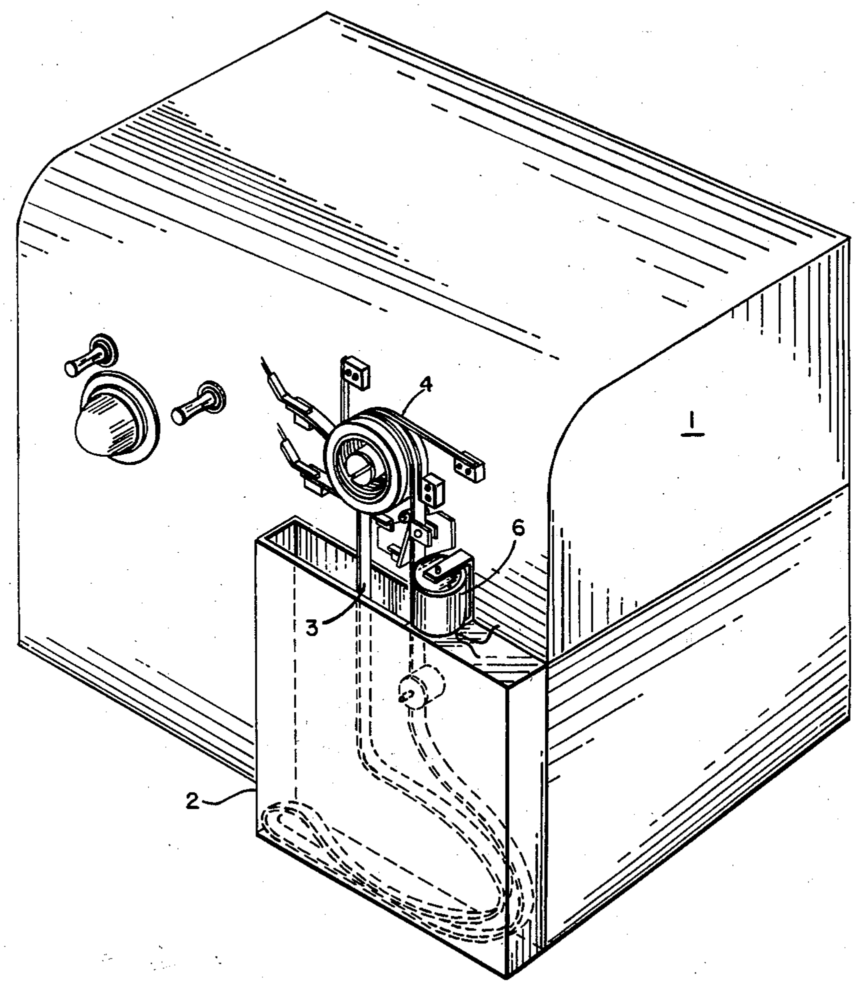
Figure 1 is a perspective view of recorder-reproducer apparatus employing the invention.

Turning first to Figure 1, there is shown housing 1 of a high speed, magnetic recorder-reproducer to the front of which is attached a bin 2 in which is stored an endless loop of flexible magnetic tape 3. The tape is trained over a constantly rotating drive capstan 4 which is integrally secured to shaft 5 for conjoint rotation therewith (see Figure 3). A magnetic brake 6 is also positioned adjacent the path of travel of the tape and may be energized, as will be explained, alternately with the magnetic capstan whereby the tape can be quickly accelerated to full operating speed or decelerated to a condition of rest.

Figures 2, 4A, 4B:
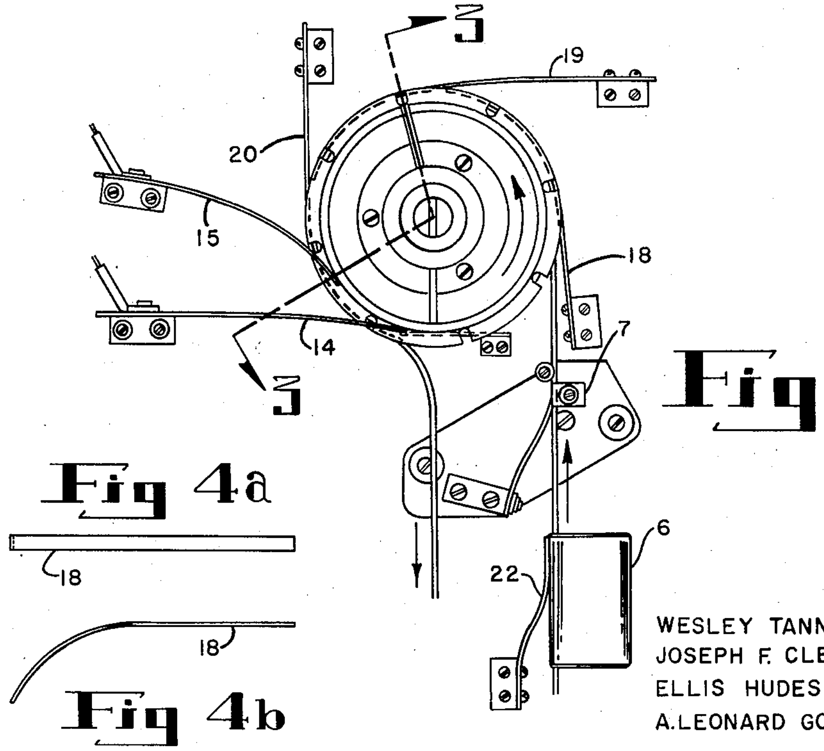
Figure 2 is an enlarged front elevational view of the drive capstan which is a part of the apparatus shown in Figure 1.

Attention should now be directed to Figure 2 which shows the capstan and magnetic brake to a larger scale. It will be noticed that the direction of capstan rotation is such that, when the tape is in motion, it is drawn out of the bin 2 and past brake 6 before engaging the capstan. Between the brake and the capstan is a recorder head 7 which may be used to impart a signal to the tape 3 or to derive a signal from the tape, depending upon the associated circuitry. Since this does not concern the present invention, it will not be described in detail.

Figure 3:
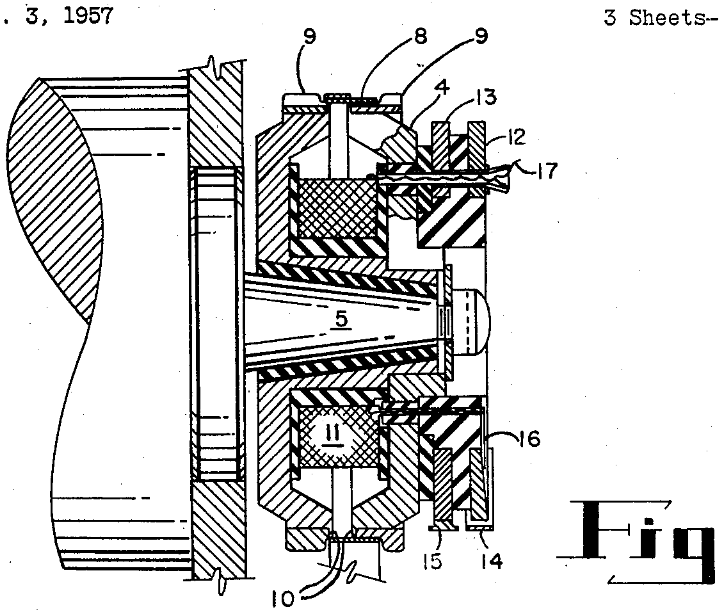
Figure 3 is an enlarged cross-sectional view of the drive capstan taken on plane 3—3 of Figure 2.

Figure 3 illustrates the tape, which is shown in cross section at 8, engaged with the periphery of the capstan. The tape may be physically guided while in engagement with the capstan by guide rings 9 and is positioned so that only one-half the width of the tape spans the gap between circular pole pieces 10 of the capstan. Magnetic flux may be established between these pole pieces through energization of the capstan winding 11 by a circuit which will be described in connection with Figure 5. It will be sufficient to understand at the moment that the winding is energized through slip rings 12 and 13 which are attached to the capstan and receive current through spring fingers 14 and 15, as illustrated in Figure 2. The current flows to the winding through wires 16 and 17 which are connected to the slip rings as shown in Figure 3.

A more detailed description of the capstan will be found in the before-mentioned pending application. Without resort to further structural details, however, it will be understood that energization of winding 11 establishes a magnetic flux across the pole pieces 10 of the capstan, and, if the tape 3 is magnetic, the tape is attracted into driven engagement with the periphery of the rotating capstan. At such time, magnetic brake 6 is de-energized to release the tape. The brake is energized when the capstan is de-energized, and in this way the tape is rapidly brought to rest.

The magnetic brake 6 is cylindrical in form and includes a winding (not shown) which may be energized to attract the tape and arrest its motion.

It has been found from actual experiments that the magnetic tape quickly becomes magnetically saturated upon energization of the capstan. For this reason, sufficient force cannot be established to accelerate the tape to full operating speed in much less than one millisecond. In other words, even by increasing the strength of the magnetic field established by winding 11, it is not possible to accelerate the tape more quickly, since saturation of the tape limits the effectiveness of the field.

Operation of the capstan can be significantly improved by providing some means that can be drawn against the tape to press it against the capstan when the winding is energized. This may be conveniently accomplished by providing metallic strips 18, 19 and 20 about the periphery of the capstan closely adjacent the exposed surface of the tape. When the winding is energized, the strips do not become magnetically saturated and are attracted against the tape with much greater force than that with which the tape is attracted to the periphery of the capstan. Since the tape is clamped between the strips and the capstan, a significant increase in tractive force is realized and the start time is significantly decreased.

The form of the strips can be readily understood from a study of Figures 2 through 4. As illustrated by Figure 2, each of the strips engages the tape for approximately a quadrant of the capstan. Strip 18 engages the tape adjacent the point where the tape first engages the capstan; strip 19 is positioned immediately after strip 18, and strip 20 immediately after strip 19. In this way, about three-quarters of the capstan periphery is embraced by the clamping strips.

Strip 18 is shown in top view in Figure 4*a* and in side view in Figure 4*b*. Although not critical, strip thickness of .006 inch has been found desirable. The thickness has been exaggerated in the drawings in the interest of clarity. Each strip is preferably made of ferromagnetic material. One such material which is particularly suitable for this application is "mumetal," which may have approximately 76% nickel, 6% copper, 1.5% chromium, and the remainder iron. Such metal is characterized by very high permeability, even at low field strength. Further, the material is desirable in having very little remanence, or residual magnetism, and consequently is subject to very low hysteresis losses. The significance of these characteristics is that during energization of winding 11, strips 18–20 form powerful magnets which firmly press the tape against the capstan. On the other hand, when the winding is de-energized, the low residual magnetism of the strips causes them to retain very little magnetism and to release the tape from engagement with the surface of the capstan. Further, the low hysteresis losses are desirable since the magnetic field must be frequently established as the tape is intermittently driven by the capstan.

During a period of relaxation when the tape is not being driven by the capstan, the strips rest lightly on the surface of the tape which remains stationary by virtue of the restraint of brake 6. It will be noted that the brake is also provided with a ferromagnetic strip 22 which serves to clamp the tape against the brake when it is energized.

When being driven by the capstan, the tape glides past the strips 18–20. This is possible because of the highly polished surface of both the tape and the strips which reduces friction between them to a negligible value.

As illustrated in Figure 3, the strips span only one-half the width of the tape, viz., that half embraced by the pole pieces of the capstan. The strips are positioned in this manner for two reasons: first, the strips are directly opposite the pole pieces from which the lines of flux emanate, and second, the strips are confined to that half of the tape which is utilized for driving purposes. It is important to note that the half of the tape between strips and pole pieces does not carry information, which would be distorted by the magnetic field of the capstan. Instead, information is confined to the other half of the tape where virtually no distortion results.

Although the invention has been described primarily with reference to magnetic tape, it will be appreciated that the presence of the strips 18–20 and 22, make it possible to use the capstan for driving non-magnetic tape, such as paper, or non-magnetic plastic tape. In such applications it is desirable to have a higher coefficient of friction between the tape and capstan than exists between the tape and the strips. During energization of the capstan winding, the strips would serve to hold the tape in driven engagement with the capstan, despite the fact that the tape itself is not attracted in any way to the capstan. This is also true of the brake during the time that it is energized.

Broadly considered, invention resides in the novel method of driving tape by providing a means that can be magnetically attracted against the tape to press it against the surface of a moving member. Although metallic strips have been described as the preferred embodiment of the invention, it will be readily appreciated that other forms of magnetic material could be provided for the purpose.

In order to accelerate the tape rapidly to full operating speed, it is desirable to pass a large amount of current through the winding 11 at the instant the tape is to be accelerated. Thereafter, while the capstan drives the tape at a constant speed, the current flowing through the winding can be maintained at a lower value. It will also be understood that it is desirable to energize the brake substantially instantaneously at the time that the tape is to be stopped. The circuit for attaining such operation will now be described with reference to Figure 5. The circuit is more particularly described and claimed in presently pending application Serial No. 689,727 entitled "Thyratron Circuit" filed on October 11, 1957 by Wesley Tannenbaum et al.

It will noticed that twelve electronic tubes, marked T1 through T12, are shown in the circuit diagram. Each of these tubes is a special-purpose thyratron tube, Type 2D21. Tubes T1 through T6 control flow of current through capstan winding 11 while tubes T7 through T12 perform this function with respect to brake 6. As will be described shortly, tubes T1 and T2 are used to produce a large initial surge of current through the winding 11, while tubes T3–T5 provide a lesser and steady flow of current during the time that the capstan is driving the tape at constant speed. Tube T6 is used to cut off tubes T3–T5 to de-energize the capstan.

Tubes T7–T11 control flow of current through the winding of the magnetic brake, indicated at 23 in Figure 5, during the time that it is energized. Tube T12 may be triggered to cut off these tubes and de-energize the brake.

Details of the circuit will now be considered. A blocking oscillator of conventional design is indicated at 24. As indicated at 25, a 20-volt positive starting pulse is supplied to the oscillator which delivers a 200-volt positive pulse to conductors 26 and 27 for energizing the capstan and de-energizing the brake. The positive pulse is fed through blocking condensers 28–32 and resistors 33–37 to the grids 38–42 of tubes T1–T5, respectively. This positive pulse overbalances the 75-volt negative bias which is normally impressed on the grids through conductors 43—44 and grid resistors 45–49.

The positive potential on the grids causes current to flow from the $B^+$ power supply 50–54 (450 volts) through resistors 56–60 to the plates and thence to the cathodes of the tubes T1–T5. Current from the cathodes flows through conductor 55 to winding 11 of the capstan.

In order to provide a large initial surge of current through the winding, condensers 61 and 62 are connected to the plates of tubes T1 and T2, respectively. When these tubes are triggered, energy stored in these condensers flows through the tubes and the winding 11. Discharge of these condensers is synchronized by cross-connections between the plate and cathode of each of the tubes. To illustrate, conductor 63 connects the plate of tube T1 to the cathode of tube T2. Coupling condenser 64 is provided in this conductor. In a similar manner, conductor 65 interconnects the plate of tube T2 with the cathode of tube T1 and includes coupling condenser 66. It will also be noted that silicon junction rectifiers 67 and 68 are connected to the cathodes of tubes T1 and T2, respectively. Current from these tubes must flow through the associated rectifiers before passing through conductor 55 to winding 11 of the capstan.

The function of the cross-connections and the rectifiers can now be considered. Assuming that tube T1 tends to pass current in advance of T2, the potential on its plate will tend to drop while the potential at the cathode of tube T2 will tend to rise as a result of current flow through conductor 55. Normally this would tend to make tube T2 less conductive, were it not for the conductor 63 which cross-connects the plate of T1 to the cathode of T2 and prevents potential build-up at the cathode. The net effect is that the tubes influence one another to discharge condensers 61 and 62 simultaneously. Rectifiers 67 and 68 prevent surges of current from the one tube to the cathode of the other tube.

After discharge of condensers 61 and 62, the potential on the plates of tube T1 and T2 drops to such a low value that the flow of current through the tubes is cut off. The potential on the plates cannot build up fast enough to re-establish current flow during the period of positive bias of the associated grids because of the time lag introduced by the relatively large resistors 56 and 57 and condensers 61 and 62. Flow of current through tubes T3–T5 continues, however, providing the magnetic field for the capstan which drives the tape at constant speed.

In order to stop the driving action of the capstan, a blocking oscillator 70 is provided to which a 20-volt positive control pulse may be supplied, as indicated at 71. This produces a 200-volt positive pulse in conductor 72 which is supplied through condenser 73 and resistor 74 to the grid 75 of tube T6. This pulse overcomes the negative bias impressed on the grid through resistor 76 and causes the tube T6 to become conductive. During such time, condenser 77 discharges through the tube, dropping the potential at the plate of the tube to such a low value that tubes T3–T5 fall below cut-off and become non-conductive. This occurs by virtue of the connection of the plate of tube T6 to the plates of tubes T3–T5 through conductors 78–83.

Rectifiers 84–86 are provided in conductors 81–83 to prevent surges of current from the plate of one tube to the plate of another which might prevent it from falling below cut-off.

So far, only the arrangement and operation of the circuit for the capstan has been considered. The circuit for controlling the brake is generally similar in that tubes T7–T11 conduct continuously during the time that the brake winding 23 is energized. These tubes are rendered conductive by a 200-volt positive pulse supplied by blocking oscillator 70 at the time the stop signal 71 is impressed upon it. Energization of the brake winding is terminated by terminating flow of current through these tubes. This is done by the 200-volt pulse supplied from oscillator 24 through conductor 27 to tube T12.

Briefly, the circuit is arranged as follows:

A negative 75-volt bias is impressed on the grid of each tube through conductors 87–93 and grid resistors 94–98. The B+ power supply is connected to the plate of each tube through plate load resistors 99–103 in conventional manner. The 200-volt positive pulse is supplied by the blocking oscillator through conductor 104 when the stop signal 71 is supplied to the oscillator. This pulse drives the grid of each tube T7–T11 into the conducting region and current flows from the B+ supply to conductor 105 which is connected to winding 23 of the brake.

The tubes remain conducting until the start pulse is impressed on the grid of tube T12 by blocking oscillator 24. This tube then conducts and discharges condenser 106 to ground at 107. The plate load resistor 108 and condenser 106 are sufficiently large to drop the potential on the plate of tube T12, which is connected to the plate of tubes T7–T11 through conductor 109, rectifiers 110–114 and coupling condensers 115–119. This renders the associated tubes nonconducting.

Thus, in summary, the pulse from blocking oscillator 24 energizes the capstan and de-energizes the brake, while the pulse from blocking oscillator 70 de-energizes the capstan and energizes the brake. It will be appreciated that the use of blocking oscillators is optional and that other means may be used, if desired, to provide the necessary pulse for triggering the thyratron tubes.

It is important to note that the circuit is effective for providing a large initial flow of current through the capstan and for alternately and substantially simultaneously energizing and de-energizing the windings of the capstan and brake.

Those skilled in the art will recognize that the preferred embodiment of this invention makes it possible to rapidly start and stop either magnetic or non-magnetic materials in response to electric control signals.

The following parameters are recommended for use in the control circuit that has been described.

| | |
|---|---|
| Capstan winding **11** | 100 turns of No. 18 insulated copper wire. |
| T1–T12 vacuum tubes | Type 2D21. |
| Brake winding **23** | 100 turns of No. 18 insulated copper wire. |
| Condensers **28–32** | .01 microfarad |
| Resistors **33–37** | 10,000 ohms, ½ watt. |
| Resistors **45–49** | 270,000 ohms, ½ watt. |
| Resistors **56–60** | 5,000 ohms, 5 watt. |
| Condensers **61–62** | 10 microfarad, 450 volt. |
| Condenser **64** | 500 micromicrofarad. |
| Condenser **66** | 500 micromicrofarad. |
| Condenser **73** | .01 microfarad. |
| Resistor **74** | 10,000 ohms, ½ watt. |
| Resistor **76** | 270,000 ohms, ½ watt. |
| Condenser **77** | 8 microfarad, 450 volt. |
| Resistors **94–98** | 470,000 ohms, ½ watt. |
| Resistors **99–103** | 5,000 ohms, 50 watt. |
| Condenser **106** | 8 microfarad, 450 volt. |
| Resistor **108** | 5,000 ohms, 5 watt. |
| Condensers **115–119** | .1 microfarad, 600 volt. |

Having described a preferred embodiment of our invention, we claim:

1. A device for quickly accelerating and driving magnetic recorder tape at high speed comprising a constantly rotating capstan including parallel spaced circular pole pieces, guide means on said capstan adjacent said pole pieces for positioning the magnetic tape so that one-half of its width spans said pole pieces, means within said capstan for quickly establishing a magnetic field across said pole pieces, and magnetic means adjacent said tape attracted by the field into engagement with the tape and pressing the tape into driven engagement with said rotating capstan.

2. Apparatus as defined in claim 1 in which said magnetic means comprise a plurality of ferromagnetic strips having a width equal to the distance across said pole pieces and positioned to correspond with said pole pieces.

3. A device for rapidly accelerating and driving a flexible tape at high speed comprising a capstan rotating at constant speed, said capstan including spaced circular pole pieces, a tape trained over the periphery of said capstan adjacent said pole pieces, magnetic means closely adjacent the exposed surface of the tape, and means within said capstan for creating a magnetic flux across said pole pieces and through said magnetic means for attracting said means against the tape and pressing the tape into driven engagement with said capstan.

4. Apparatus as defined in claim 3 in which said magnetic means comprises a strip of ferromagnetic material.

5. In combination in recorder-reproducer apparatus utilizing flexible magnetic tape, a rotary capstan over which the tape is trained, means for establishing a magnetic field within said capstan for attracting the tape into driven engagement with the periphery of said capstan, and magnetic means adjacent the tape attracted to said capstan by the magnetic field and positioned to press the tape against the periphery of said capstan.

6. A device for driving a flexible material comprising a rotary capstan over which the material is trained, magnetic means adjacent the exposed surface of the material, and means within said capstan for creating a magnetic field within said capstan and said magnetic means for attracting said magnetic means toward said capstan and pressing the material into driven engagement with its periphery.

7. A device for imparting motion to a material comprising a moving drive member adjacent which the material is positioned, magnetic means adjacent the material and remote from said drive member, and means for establishing a magnetic field for attracting said means toward said member and pressing said material into driven engagement with said member.

8. A device for arresting the motion of tape comprising stationary means positioned adjacent the path of travel of the tape, magnetic means adjacent the surface of the tape remote from said stationary means, and electrical means within said stationary means for establishing a magnetic field and attracting said magnetic means toward the tape for clamping it against said stationary means.

9. The method of rapidly accelerating magnetic tape which comprises passing the tape over a rotating capstan, establishing a magnetic field within the capstan to attract the tape against its periphery, and pressing the tape against the periphery of the capstan by magnetic means attracted against the tape by the magnetic field.

10. The method of rapidly accelerating a piece of material which comprises positioning it closely adjacent a moving member, positioning magnetic means adjacent the material remote from the moving member, and pressing the material against the moving member by establishing a magnetic field to force the magnetic means against the material.

11. The method of rapidly accelerating tape which comprises pasing the tape over a rotating capstan, establishing a magnetic field within the capstan, and pressing the tape against the periphery of the capstan by magnetic means attracted against the tape by the magnetic field.

12. The method of rapidly accelerating tape and driving it thereafter at constant speed which comprises training the tape over the periphery of a rotating capstan, suddenly establishing a magnetic field within the capstan, pressing the tape against the periphery of the capstan by magnetic means attracted against the tape by the magnetic field, and reducing the strength of the field after the tape has been accelerated to operating speed.

References Cited in the file of this patent

UNITED STATES PATENTS

| | | |
|---|---|---|
| 1,561,063 | Dunlap | Nov. 10, 1925 |
| 2,684,815 | Holz | July 27, 1954 |
| 2,695,140 | Haugaard | Nov. 23, 1954 |

FOREIGN PATENTS

| | | |
|---|---|---|
| 475,924 | Canada | Aug. 7, 1951 |